United States Patent Office 3,086,955
Patented Apr. 23, 1963

3,086,955
COMPOSITION OF HALOGENATED BUTYL RUBBER AND ZINC THIOCARBAMATE AND PROCESS OF CURING SAME
Theodore Lemiszka, Roselle, Delmer L. Cottle, Highland Park, and Leon S. Minckler, Jr., Metuchen, N.J., assignors to Esso Research and Engineering Company, a corporation of Delaware
No Drawing. Filed Feb. 19, 1958, Ser. No. 716,041
15 Claims. (Cl. 260—41.5)

This invention relates to rubbery polymeric compositions which are halogenated copolymers of isoolefins and multiolefins and to the preparation and vulcanization of such compositions and more particularly to improved methods for curing halogenated butyl rubber in the absence of added sulfur or zinc oxide with minor proportions of metal thiocarbamates.

Copolymers of the above general type, especially where the copolymer contains about 85 to 99.5% (preferably about 95 to 99.5%) of a $C_4$ to $C_7$ isoolefin such as 2-methyl-1-butene, 3-methyl-1-butene or isobutylene with about 15 to 0.5% (preferably 5 to 0.5 weight percent) of a multiolefin of about 4 to 14, preferably about 4 to 6 carbon atoms and having a Staudinger molecular weight of between about 20,000 and 300,000, are commonly referred to in patents and literature as "butyl rubber" or GR–I rubber (Government Rubber-Isobutylene) and, for example, is referred to as "butyl rubber" in textbook "Synthetic Rubber" by G. S. Whitby. The preparation of butyl type rubber is described in U.S. Patent 2,356,128 ot Thomas et al. as well as in technical literature. In general, the multiolefinic component of the rubber comprises such multiolefins as myrcene, allo-ocymene or dimethallyl or preferably a conjugated diolefin such as isoprene, butadiene, dimethyl butadiene, piperylene, etc. The reaction product of isobutylene and isoprene is preferred. Butyl rubber has a mole percent unsaturation of between about 0.5 to 15.0.

Halogenated butyl-type rubbery copolymers, which are vulcanizable with zinc oxide and covulcanizable with more highly unsaturated rubbers, are produced by halogenating the butyl rubber in a manner which does not appreciably degrade the molecular weight thereof, but halogenated sufficiently to produce a rubbery product which when vulcanized by sulfur retains its tensile strength upon heat aging. Such halogenated butyl rubbers are also readily covulcanizable with more highly unsaturated rubbers by means of added sulfur to produce rubbery products of excellent heat aging resistance. The halogenated butyl rubbers so formed also do not greatly differ in curing rate as compared to natural rubber and synthetic rubbers such as GR–S rubber. The sulfur cures may optionally also be in the presence of basic metal oxides such as zinc oxide and accelerators.

It has now been discovered that halogenated butyl rubber may be vulcanized effectively in the absence of either added elemental sulfur or zinc oxide solely by metal thiocarbamates. Suitable metal thiocarbamates for the purposes of the present invention include group I to group VIII metal alkyl thiocarbamates, advantageously group I to group VI metal poly $C_1$ to $C_8$ alkylpolythiocarbamates and preferably group I, II, IV, V or VI metal di $C_1$ to $C_4$ alkyl dithiocarbamates. Typical metal thiocarbamates include among others, copper dimethyl dithiocarbamate, zinc dibutyl dithiocarbamate, lead dimethyl dithiocarbamate, bismuth dimethyl dithiocarbamate, selenium diethyl dithiocarbamate, tellurium diethyl dithiocarbamate, mixtures thereof, etc.

In practicing the present invention, 100 parts by weight of halogenated butyl rubber are compounded in the absence of added elemental sulfur and metal oxides with about 2 to 30, advantageously about 3 to 20 parts by weight of a metal thiocarbamate and preferably also with about 20 to 100 parts by weight of a filler such as clays or carbon blacks, with the optional addition of such conventional compounding agents as antioxidants such as phenyl beta-naphthylamine, antitack agents such as stearic acid, resins, plasticizers, etc. The resulting compounded stock is then cured by heating the same for about 0.5 minute to 5 hours, preferably for about 2 minutes to 2 hours at a temperature level of between about 100° to 450° F., advantageously at about 200° to 400° F., and preferably at about 250° to 350° F. to produce a vulcanizate having excellent tensile strength, modulus, and elongation.

In producing halogenated butyl rubber to be vulcanized in accordance with the present invention, unmodified, unvulcanized butyl rubber is carefully halogenated so as to contain about at least 0.5 weight percent (preferably at least about 1.0 weight percent) combined halogen but not more than about "X" weight percent combined chlorine or 3 "X" weight percent combined bromine wherein:

$$X = \frac{M_3 L}{(100-L)M_1 + L(M_2+M_3)} \times 100$$

and:

$L$ = mole percent of the multiolefin in the polymer
$M_1$ = molecular weight of the isoolefin
$M_2$ = molecular weight of the multiolefin
$M_3$ = atomic weight of chlorine or bromine Restated, there should be at least about 0.5 weight percent of combined halogen in the polymer but not more than about one atom of chlorine or three atoms of bromine combined in the polymer per molecule of multiolefin present therein; i.e., not more than about one atom of combined chlorine or three atoms of combined bromine per double bond in the polymer.

Suitable halogenating agents which may be employed are gaseous chlorine, liquid bromine, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), pyridinium chloride perchloride, N-bromo-succinimide, iodine monochloride, N-chloroacetanilide, tribromophenol bromide, N-chloroacetamide, N,N'-dimethyl-5,5 dichloro or dibromo hydantoin, and other common halogenating agents.

The halogenation is generally conducted at about 0° to about +200° C., advantageously at about 10° to 65° C., preferably at about 20° to 50° C. (room temperature generally being satisfactory), depending upon the particular halogenation agent, for about one minute to several hours. An advantageously pressure range is from about 0.5 to 400 p.s.i.a.; atmospheric pressure being satisfactory. The halogenation conditions are regulated to halogenate the rubbery copolymer to the extent above-mentioned.

The halogenation may be accomplished in various ways. One process comprises preparing a solution of the copolymer as above, in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc., and adding thereto gaseous chlorine, liquid bromine, or other halogenating agent, which may optionally be in solution, such as dissolved in any inert hydrocarbon, an alkyl chloride, carbon tetrachloride, etc.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The halogenated polymer may be precipitated with acetone or any other known non-solvent for the halogenated butyl rubber and dried under about 1 to 760 millimeters or higher of mercury pressure absolute at about 0° to 180° C., preferably at about 50° to 150° C. (e.g. 70° C.). Other methods of recovering the halogenated butyl rubber polymer from the hydrocarbon solution of the same are by conventional spray or drum drying techniques. Alternatively the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 200,000 and 2,500,000 and a mole percent unsaturation of between about 0.5 to 15.0, preferably about 0.6 to 5.0.

In order to more fully illustrate the present invention, the following experimental data are given:

CHLORINATED BUTYL RUBBER "A"

A copolymer of about 97% isobutylene and 3% isoprene having a viscosity average molecular weight of 320,000 was dissolved in hexane to form a 10% solution. To this polymer solution, a 20 weight percent (based on the polymer) of liquid sulfuryl chloride as the chlorinating agent was added and reacted for 30 minutes with the polymer at room temperature. The resulting chlorinated copolymer was precipitated with acetone, collected and redissolved in hexane three times and ultimately dried and analyzed and found to have a viscosity average molecular weight of 320,000 and to contain 1.4% chlorine based on the polymer. The physical characteristics of both zinc oxide and diamine-cured vulcanizates, containing this chlorinated interpolymer, were excellent.

CHLORINATED RUBBERS "B" TO "L"

Other examples of halogenated isoolefin-multiolefin copolymers which can be used are tabulated hereinafter, the amount of isoolefin and multiolefin in copolymer, halogenation agent, and amount of halogen combined in the copolymer being as follows:

CHLORINATED BUTYL RUBBER "M"

An additional run was made chlorinating a commercial butyl rubber dissolved in benzene. The butyl rubber had a Mooney viscosity at 212° F. for 8 minutes of 75, and a mole percent unsaturation of 1.6. The chlorination of a solution of the uncured butyl rubber was conducted in a 500-gallon glass-lined Pfaudler reactor equipped with an agitator, baffle, submersed stainless steel sparger ring and a conduit leading into the ring.

Gaseous chlorine was continuously added to the butyl rubber solution over a period of one-half hour at a temperature level of 30° C. and under atmospheric pressure. The chlorine was added to the reactor through the conduit via the sparger ring. The chlorination was then terminated and the solution containing the chlorinated butyl rubber formed was agitated for an additional 20 minutes. The resulting solution of chlorinated butyl rubber was then water washed three times to remove dissolved hydrogen chloride.

The absolute amount of butyl rubber, benzene solvent and gaseous chlorine added, as well as the calculated percent of added chlorine based on polymer and resulting percent of chlorine combined in the polymer were as follows:

|  | Pounds | Percent in composition |
|---|---|---|
| Butyl rubber | 170 | 98.65 |
| Benzene solvent | 1,540 |  |
| Chlorine added | [1] 4.8 | 1.35 |

[1] 2.8 percent.

The resulting water-washed solution containing the stabilized, chlorinated butyl rubber "M" was then recovered by injecting the solution into an agitated aqueous slurry containing zinc stearate and a small amount of the nonionic wetting agent of the aliphatic polyoxyethylene ether type such as Tergitol NPX (e.g., Sterox AJ) in an amount of 0.7 pound of the zinc stearate per 100 pounds of chlorinated butyl rubber as a dispersing aid. The agitated solution was maintained at a temperature between about 190° and 210° F. (e.g., 200° F.) thereby to flash off the benzene solvent and form an aqueous slurry of the chlorinated butyl rubber in water. This slurry was then filtered and the chlorinated butyl rubber, which was in the form of a wet "crumb," was placed in a Proctor and Schwartz tray drier maintained at 180° F. (i.e. 82° C.) and dried for 12 hours. The crumb depth on the tray was about ½ inch. The crumb was then completely dried and compacted by milling for 15 minutes on a conventional rubber mill having a roll temperature of 260° F. (i.e., 127° C.).

Example I

A chlorinated butyl rubber and a brominated butyl rubber were each compounded as follows and vulcanized with copper dimethyl dithiocarbamate as more fully disclosed hereinafter. In all examples, the chlorinated butyl rubber had a Mooney viscosity (212° F. for 8 minutes) of 58, a mole percent unsaturation of 0.90, a viscosity

| Halogenated rubber | Isoolefin, (percent) [1] | Multiolefin, (percent) [1] | Halogenation agent | Halogen in the rubber (percent) [1] |
|---|---|---|---|---|
| B | Isobutylene (98) | Isoprene (2) | $SO_2Cl_2$ | Chlorine (1.2). |
| C | Isobutylene (95) | Isoprene (5) | $Cl_2$ in $CCl_4$ | Chlorine (2.5). |
| D | Isobutylene (94) | Cyclopentadiene (6) | do | Chlorine (2.0). |
| E | Isobutylene (92) | Myrcene (8) | do | Chlorine (1.6). |
| F | 2-methyl-butene-1 (95) | Isoprene (5) | $Cl_2$ in hexane | Chlorine (1.5). |
| G | 3-methyl-butene-1 (96) | Butadiene (4) | do | Chlorine (1.9). |
| H | Isobutylene (98) | 1-vinyl cyclohexene-3 (2) | $Cl_2$ in $CCl_4$ | Chlorine (0.8). |
| I | Isobutylene (92) | Butadiene (8) | Gaseous chlorine | Chlorine (2.8). |
| J | Isobutylene (85) | Isoprene (15) | do | Chlorine (6.6). |
| K | Isobutylene (98) | Isoprene (2) | N,N'-dichloro-5,5-dimethyl hydantoin | Chlorine (1.1). |
| L | do | do | Liquid bromine | Bromine (2.3). |

[1] Percent in all instances is percent by weight.

average molecular weight of 455,000 and contained 1.20 weight percent of combined chlorine. Also, in all examples, the brominated butyl rubber had a Mooney viscosity (212° F. for 8 minutes) of 66, a mole percent unsaturation of 0.71, a viscosity average molecular weight of 480,000, and contained 2.2 weight percent of combined bromine. All samples were compounded as follows.

| Component: | Parts by weight |
|---|---|
| Halogenated butyl rubber | 100 |
| Stearic acid | 1.0 |
| HAF carbon black | 50 |
| Copper thiocarbamate | 5.0 |

All cures were at 307° F. for the times hereinafter given. The results were as follows:

|  | Chlorinated butyl rubber | Brominated butyl rubber | |
|---|---|---|---|
| Curing time (minutes) | 60 | 30 | 60 |
| Modulus at 300% elongation (p.s.i.) | 510 | 1,040 | 1,100 |
| Tensile strength (p.s.i.) | 1,125 | 2,325 | 2,400 |
| Elongation (percent) | 620 | 530 | 530 |

*Example II*

The same general procedure as in Example I was repeated using zinc dibutyl dithiocarbamate as the metal thiocarbamate curing agent with the following results:

|  | Chlorinated butyl rubber | | | Brominated butyl rubber | | |
|---|---|---|---|---|---|---|
| Curing time (minutes) | 5 | 30 | 60 | 5 | 30 | 60 |
| Modulus at 300% elongation (p.s.i.) | 650 | 1,210 | 1,465 | 525 | 735 | 790 |
| Tensile strength (p.s.i.) | 2,045 | 2,550 | 2,550 | 2,210 | 2,380 | 2,325 |
| Elongation (percent) | 675 | 545 | 475 | 675 | 645 | 615 |

*Example III*

The same general procedure as in Example I was repeated using lead dimethyl dithiocarbamate as the sole curative with the following results:

|  | Brominated butyl rubber | |
|---|---|---|
| Curing time (minutes) | 30 | 60 |
| Modulus at 300% elongation (p.s.i.) | 1,405 | 2,135 |
| Tensile strength (p.s.i.) | 2,100 | 2,590 |
| Elongation (percent) | 415 | 355 |

*Example IV*

The same general procedure as in Example III was repeated using bismuth dimethyl dithiocarbamate as the sole vulcanization agent with the following results:

|  | Brominated butyl rubber | |
|---|---|---|
| Curing time (minutes) | 30 | 60 |
| Modulus at 300% elongation (p.s.i.) | 895 | 1,030 |
| Tensile strength (p.s.i.) | 1,665 | 1,845 |
| Elongation (percent) | 485 | 455 |

*Example V*

The same general procedure as in Example I was repeated using selenium diethyl dithiocarbamate as the metal thiocarbamate sole curative with the following results:

|  | Chlorinated butyl rubber | | Brominated butyl rubber | |
|---|---|---|---|---|
| Curing time (minutes) | 30 | 60 | 30 | 60 |
| Modulus at 300% elongation (p.s.i.) | 410 | 965 | 820 | 1,200 |
| Tensile strength (p.s.i.) | 1,050 | 2,190 | 2,475 | 2,700 |
| Elongation (percent) | 7,050 | 550 | 610 | 580 |

*Example VI*

The same general procedure as in Example II was repeated using solely tellurium diethyl dithiocarbamate as the vulcanization agent with the following results:

|  | Chlorinated butyl rubber | | | Brominated butyl rubber | | |
|---|---|---|---|---|---|---|
| Curing time (minutes) | 5 | 30 | 60 | 5 | 30 | 60 |
| Modulus at 300% elongation (p.s.i.) | 445 | 920 | 1,230 | 600 | 1,250 | 1,555 |
| Tensile strength (p.s.i.) | 2,165 | 2,760 | 2,815 | 2,070 | 2,760 | 2,635 |
| Elongation (percent) | 775 | 645 | 585 | 665 | 530 | 445 |

The above examples show that butyl rubber is effectively vulcanized into materials of high tensile strength and good modulus and elongation using as sole curative agents groups I, II, IV, V, or VI metal thiocarbamates.

Resort may be had to modifications and variations of the disclosed embodiments without departing from the spirit of the invention or the scope of the appended claims.

What is claimed is:

1. A composition comprising a major proportion of a rubbery halogenated copolymer of about 85 to 99.5 wt. percent of a $C_4$ and $C_7$ isoolefin and about 15 to 0.5 wt. percent of a $C_4$ to $C_{14}$ multiolefin and a minor proportion of a zinc thiocarbamate, said zinc thiocarbamate being the sole curing agent in said composition.

2. A composition according to claim 1 in which the halogenated copolymer contains at least 0.5 weight percent chlorine but not more than about one atom of chlorine per double bond in the copolymer.

3. A composition according to claim 1 in which the halogenated copolymer contains at least about 0.5 weight percent bromine but not more than about three combined atoms of bromine per double bond in the copolymer.

4. A composition according to claim 1 in which the zinc thiocarbamate is present in an amount of between about 2.0 and 30 weight percent based on halogenated copolymer.

5. A composition according to claim 1 containing about 20 to 100 parts by weight per 100 parts by weight of copolymer of a carbon black.

6. A composition according to claim 1 in which the halogenated copolymer is selected from the group consisting of chlorinated butyl rubber and brominated butyl rubber.

7. A composition according to claim 1 in which the zinc thiocarbamate comprises zinc dibutyl dithiocarbamate.

8. A composition according to claim 1 which has been vulcanized by heating the same for between about 0.5 minute and 5 hours at a temperature level of between about 100° and 450° F. to produce a vulcanizate having a high tensile strength, extension modulus and elongation.

9. A composition comprising a rubbery polymer having a viscosity average molecular weight of at least about 100,000 comprising atoms of hydrogen, carbon and a halogen selected from the group consisting of bromine and chlorine, containing in its structure a major proportion of hydrocarbon units derived by the polymerization of isoolefins containing about 4 to 7 carbon atoms and also containing sufficient units in which a pair of carbon atoms is linked by an olefinic double bond that the mole percent unsaturation is between about 0.5 and 15; said polymer containing at least about 0.5 weight percent halogen but not more than about one combined atom of halogen per double bond in the polymer; said polymer being in composition with a vulcanizing amount of a zinc di $C_1$ to $C_4$ alkyl thiocarbamate; said zinc di $C_1$ to $C_4$ alkyl thiocarbamate being the sole curing agent in said composition.

10. A composition according to claim 9 in which the polymer contains chlorine.

11. A composition according to claim 9 in which the polymer contains bromine.

12. A composition according to claim 9 in which the zinc thiocarbamate is present in an amount of between 3 and 20 weight percent based on the halogen-containing copolymer.

13. A process which comprises vulcanizing a halogenated isoolefin-multiolefin butyl rubber copolymer in the presence of between about 2.0 and 30.0 weight percent of a zinc thiocarbamate at a temperature level of between about 200° and 450° F., said zinc thiocarbamate being the sole curing agent for said butyl rubber copolymer.

14. A process according to claim 13 in which the halogenated isoolefin-multiolefin butyl rubber copolymer contains chlorine.

15. A process according to claim 13 in which the halogenated isoolefin-multiolefin butyl rubber copolymer contains bromine.

References Cited in the file of this patent

UNITED STATES PATENTS

| | | |
|---|---|---|
| 2,391,742 | Roberts | Dec. 25, 1945 |
| 2,631,984 | Crawford et al. | Mar. 17, 1953 |
| 2,702,286 | Iknayan et al. | Feb. 15, 1955 |
| 2,732,354 | Morrissey et al. | Jan. 24, 1956 |
| 2,891,595 | Kuntz et al. | June 28, 1959 |
| 2,964,489 | Baldwin et al. | Dec. 13, 1960 |